March 15, 1955    J. E. FIELDEN    2,704,342
FLUID LEVEL ACTUATED FOLLOW-UP MECHANISM
Filed April 13, 1951    2 Sheets-Sheet 1
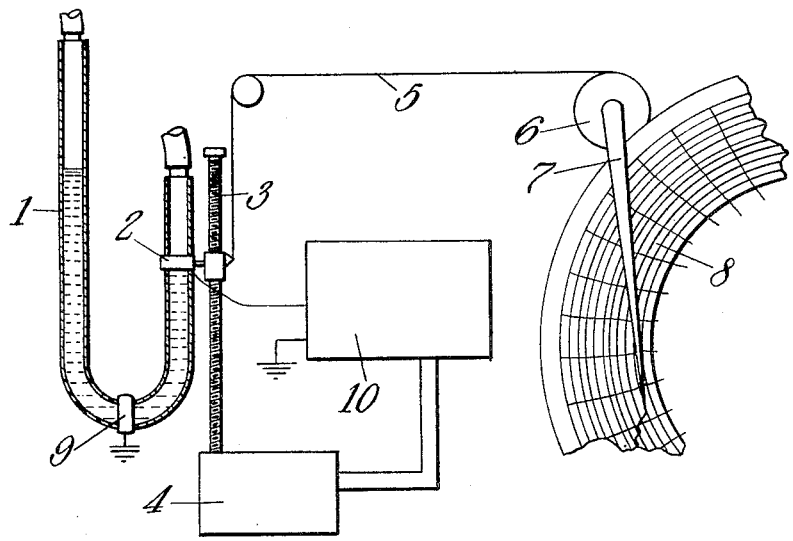
Fig.1.
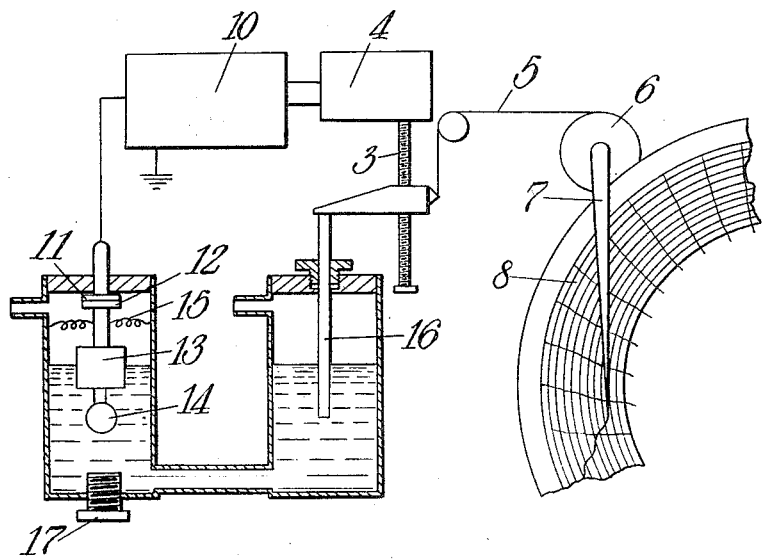
Fig.2.    Inventor
J. E. Fielden

United States Patent Office 2,704,342
Patented Mar. 15, 1955

2,704,342

FLUID LEVEL ACTUATED FOLLOW-UP MECHANISM

John Ernest Fielden, Wythenshawe, England, assignor, by mesne assignments, to Robertshaw-Fulton Controls Company, Greensburg, Pa.

Application April 13, 1951, Serial No. 220,790

2 Claims. (Cl. 318—31)

This invention relates to apparatus for measuring, indicating or recording quantities of various kinds and for controlling similar quantities.

In accordance with the invention a liquid level is caused to rise or fall in accordance with the quantity being dealt with, and electro-mechanical means are provided for moving an element in accordance with the movements of the liquid level and for correspondingly actuating an indicating, recording, controlling or like means.

In dealing with temperatures, a thermometer containing mercury or other liquid may be used, and for measuring pressures, or quantities capable of being converted into pressures such as air-speeds, flow velocities, specific gravities, or levels of liquids in containers, a U-tube containing mercury or other liquid may be used.

The invention further comprises an arrangement in which a variation in liquid level produces a change in the electrical capacity of an electrode forming part of an electronic capacity sensitive circuit which then operates means for restoring the original capacity and for correspondingly displacing an indicating or recording member.

Preferably the electro-mechanical means comprises an electronic capacity sensitive circuit including a valve oscillator and a high impedance radio frequency bridge system of which a capacity constituted by an electrode and the bulk of the liquid forms a part, the bridge being at balance when the electrode is at a predetermined distance from the surface of the liquid, and a phase-sensitive motor arranged to receive from the electronic circuit a current which lags or leads, as compared with its normal phase, when the bridge becomes unbalanced in one direction or the other.

The movable element or electrode may be a ring suspended so as to surround a tube containing the liquid and move up and down in accordance with the liquid level, or in the case of an open vessel or tube, a body suspended a short distance above the liquid level.

According to a further embodiment of the invention, the electrode is placed in a tube made of a non-conducting substance, such as glass, the said tube and electrode being immersed in a tank containing the fluid whose level is required to be indicated or measured. In such an arrangement the means for moving the electrode are introduced into the tube itself, the device operating in the manner hereinbefore described.

In a further embodiment of the invention, a fixed electrode is used in one limb of a U-tube. A float held in the tube by a flexible connection may be provided to coact capacitatively with the electrode. A rod dips into the liquid in the other limb of the U-tube and is raised or lowered by the electro-mechanical means to displace liquid in order to restore the balance of the bridge. This arrangement may be made very sensitive to small changes of level, and a relay may be provided in the circuit of the motor control winding, which while not affected by slow changes of level, due for example to slow changes of pressure, will respond to a rapid change and operate an alarm.

The electrical circuit arrangement may be such that the oscillator output is rectified by the grid-cathode circuit of a thyratron acting as a diode, and, consequently, when oscillation occurs a negative charge accumulates on the grid-condenser and the thyratron is prevented from firing. The anode current of either the oscillator or the thyratron according to whether oscillation is occurring or not, may control a phase-sensitive reversible electric motor, or a solenoid may be connected in the anode circuit of the thyratron with a plunger attached to a cord passing round a driving pulley and attached to a spring, so that when the solenoid is energised the plunger is attracted and turns the pulley, and when the solenoid is de-energised the spring pulls the plunger back and turns the pulley in the opposite direction. It is also possible to use a balanced arrangement of two solenoids associated with separate thyratrons for driving the arm in one or other direction.

With these arrangements, the movable element is normally stationary in, or performing very small oscillations about, a position close to the liquid level, and when the liquid level moves either up or down, the driving means drive the element to a position close to the new level, and at the same time drive an indicating device, a recording pen, a device for controlling the quantity being measured, a potentiometric transmission system for relaying movements of the liquid level to a distant point, or the like.

Referring to the accompanying explanatory drawings:

Figure 1 shows diagrammatically one form of the apparatus in accordance with the invention.

Figure 2 shows a second form of the apparatus.

Figure 3:
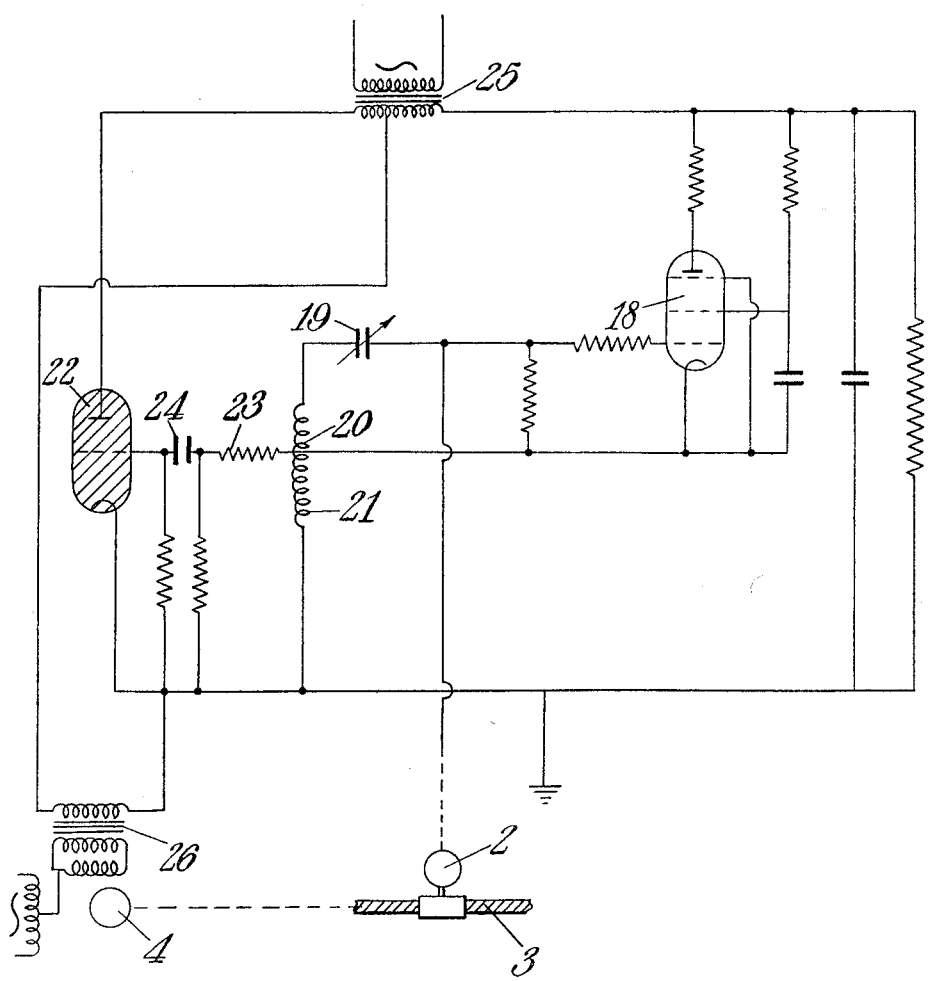
Figure 3 is a circuit diagram showing a suitable capacity sensitive circuit.

Referring to Figure 1, a glass U-tube 1 contains a suitable liquid, and the ends of the tube are connected to points of differential pressure. Around one leg of the U-tube is a small metal band 2 arranged to be moved up or down by a lead screw 3 rotated by a servo-motor 4. Movement of the band 2 is transferred by a cord 5 to a spring loaded drum 6 which turns an arm 7 carrying a pen for recording the position of the band 2 on a chart 8. A stationary ring 9 surrounding the tube is earthed.

The servo-motor 4 is controlled by an electronic capacity sensitive circuit 10, of which the electrical capacity between the band 2 and the meniscus of the liquid forms a part. The arrangement is such that whenever the meniscus moves, thereby varying the capacity, the circuit 10 causes the motor 4 to run in such a direction as to make the band 2 follow the meniscus. Consequently the pen carried by the arm 7 records on the chart the position of the meniscus. The pen arm and chart could if desired be replaced by a pointer and dial.

The arrangement shown in Figure 1 is suitable for differential pressures giving full scale values in the range 1 inch water to 8 inches mercury at static pressures close to atmospheric. For similar pressures at static pressures up to say 400 lb. per square inch, the U-tube may be a short length of gauge glass tubing glanded into a steel structure. In some applications it may be convenient if one limb of the U-tube is extended outside the case of the instrument.

For low differential pressures giving full scale values in the range ⅛ inch to 2 inches of water, at static pressures close to atmospheric, an arrangement as shown in Figure 2 is suitable. The capacity sensitive circuit 10 includes a condenser comprising a fixed plate 11 and a plate 12 mounted on a float 13 which is stabilised by a weight 14 and springs 15, and floats in the liquid in one leg of the U-tube. A plunger 16 dipping into the liquid in the other leg of the U-tube is moved up or down by the lead screw 3 driven by the motor 4 and is connected to the drum 6 carrying the pen arm 7. There is a zero adjusting screw 17 in the U-tube.

When the liquid level moves, the condenser plate 12 moves also, and the variation in capacity causes the circuit 10 to operate the motor to raise or lower the plunger 16 until the original level is restored in the limb containing the float. The pen arm is at the same time operated in a corresponding manner. The full scale range of the instrument depends on the plunger diameter and the diameter of the drum 6.

Figure 3 shows a suitable capacity sensitive circuit. An oscillator valve 18 has in its grid-cathode circuit a variable condenser 19 in series with an inductance 20, and also the capacity of the band 2 (or condenser 11, 12) and an inductance 21. These capacities form a high impedance radio frequency bridge system which determines the phase of the feed-back of the oscillator. When 19 is greater than the band capacity the feed-back is positive and the valve will oscillate and when 19 is less than the band capacity the feed-back is negative and no oscillation occurs.

22 is a thyratron, to the grid of which the junction of 20 and 21 is connected through a resistance 23 and condenser 24. The valve anodes are supplied with A. C. in antiphase, from a transformer 25, so that radio frequency oscillations can be produced only during alternate half cycles, and the valve 18 is able to conduct only during alternate half cycles of the A. C. supply when the valve 22 is not conducting.

The output of the oscillator is rectified by the grid-cathode circuit of the thyratron 22, acting as a diode, and consequently when oscillation occurs a negative charge accumulates on the grid condenser 24 whereby the thyratron is prevented from firing at the following half cycle. When oscillation is not occurring the negative charge can leak away and the thyratron can fire at successive half cycles. In the cathode circuit of the two valves is connected a transformer 26, the secondary of which feeds the phase-sensitive reversible electric motor 4. When there is no oscillation and the thyratron is conducting the motors runs in one direction, and it is arranged so that when running in this direction it moves the band away from the liquid meniscus. As soon as a predetermined short distance between the band and the meniscus is exceeded, oscillation begins, the thyratron ceases to conduct, and the anode current of the valve 18 passes through the transformer 26 in opposite phase to the thyratron current and reverses the motor. Consequently the motor always tends to drive the band 2 towards a position close to the liquid meniscus. While the liquid level remains constant, the band may perform very minute oscillations about the desired position, and when the level is displaced the band follows it and then oscillates about the new position.

The instrument may be arranged to operate switch means at any desired level, for operating controlling or other apparatus.

The instrument can be used to record or indicate any physical measurement which can be made with a manometer, such as flow of liquids or gases, specific gravity, vaccum, flue draught, forced draught, or barometric pressure. It requires only a very small volumetric displacement, and the output power available is unlimited.

What I claim is:

1. In apparatus for indicating the level of a liquid, the combination comprising an oscillator, means for controlling oscillations in said oscillator, including a capacitor comprising a movable electrode adjacent the liquid level and having an electrical capacitance relative thereto said last named means being constructed and arranged to permit said oscillator to oscillate when said capacitance varies in one direction from a predetermined value and to suppress oscillations in said oscillator when said capacitance varies in another direction from said predetermined value, reversible motor means connected to said electrode for moving the same relative to said liquid level for varying said capacitance, means for energising said motor means for moving said electrode relative to said liquid level to increase said capacitance, means for energising said motor means for moving said electrode relative to said liquid level to decrease said capacitance including a thyratron connected between a source of alternating current and said motor means, and circuit means connecting said oscillator and said energising means for rendering one of said energising means operable while said oscillator is oscillating and the energising means including the thyratron operable while said oscillations are suppressed, said circuit means including a condenser connected to the grid of said thyratron for accumulating a negative charge and preventing said thyratron from firing on at least alternate half cycles of said source while said oscillator is oscillating.

2. The combination claimed in claim 1, wherein said oscillator includes an electric valve, said one energising means including a connection between the cathode of said valve and said motor means, said thyratron and valve having a common cathode circuit and being connected to said source to be supplied with alternating current in antiphase.

References Cited in the file of this patent

UNITED STATES PATENTS

| | | |
|---|---|---|
| 1,838,084 | Drake | Dec. 29, 1931 |
| 2,032,016 | Hitner | Feb. 25, 1936 |
| 2,354,945 | Cohen et al. | Aug. 1, 1944 |
| 2,357,745 | Kliever | Sept. 5, 1944 |
| 2,359,927 | Melas | Oct. 10, 1944 |
| 2,363,690 | Razek | Nov. 28, 1944 |
| 2,437,661 | Coake | Mar. 9, 1948 |
| 2,497,051 | Wild et al. | Feb. 7, 1950 |
| 2,619,620 | Tapp et al. | Nov. 25, 1952 |

FOREIGN PATENTS

| | | |
|---|---|---|
| 620,845 | Germany | Oct. 30, 1935 |